United States Patent
Houjou et al.

(10) Patent No.: US 9,641,662 B2
(45) Date of Patent: May 2, 2017

(54) INFORMATION PROCESSING SYSTEM, WIRELESS TERMINAL, LAUNCHING METHOD OF PORTABLE INFORMATION TERMINAL AND COMPUTER READABLE RECORDING MEDIUM HAVING PROGRAM FOR CONTROLLING THEREOF

(71) Applicant: CASIO COMPUTER CO., LTD., Shibuya-ku, Tokyo (JP)

(72) Inventors: Yoshiharu Houjou, Nerima-ku Tokyo (JP); Kazuko Hayashi, Hamura (JP); Koji Yamamoto, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 558 days.

(21) Appl. No.: 14/086,542

(22) Filed: Nov. 21, 2013

(65) Prior Publication Data

US 2014/0181183 A1    Jun. 26, 2014

(30) Foreign Application Priority Data

Dec. 20, 2012 (JP) .................................. 2012-278262
Mar. 21, 2013 (JP) .................................. 2013-057638

(51) Int. Cl.
*H04W 8/24* (2009.01)
*H04M 1/725* (2006.01)

(52) U.S. Cl.
CPC ...... *H04M 1/7253* (2013.01); *H04M 1/72552* (2013.01)

(58) Field of Classification Search
CPC ....... H04W 4/02; H04W 4/008; H04W 4/005; H04W 68/005; H04W 88/02; H04M 1/7253; H04M 1/72552

(Continued)

(56) References Cited

U.S. PATENT DOCUMENTS 8,059,573 B2    11/2011 Julian et al.
8,412,798 B1 *  4/2013  Wang .................... H04L 67/06
                                                        709/206

(Continued)

FOREIGN PATENT DOCUMENTS

CN      1409566 A      4/2003
JP   2006-245957 A     9/2006

(Continued)

OTHER PUBLICATIONS

Ewan Spence, "It's Fashionable for Geeks, But Sony's Android SmartWatch Is Not Ready for Prime Time," Sep. 29, 2012, Forbes.com, www.forbes.com/sites/ewanspence/2012/09/29/its-fashionable-for-geeks-but-sonys-android-smartwatch-is-not-ready-for-prime-time/#45b2bf2e7900.*

(Continued)

Primary Examiner — Ruolei Zong
(74) Attorney, Agent, or Firm — Holtz, Holtz & Volek PC

(57) ABSTRACT

The present invention provides an information processing system including a portable information terminal having a plurality of functions and a wireless terminal which wirelessly communicates with the portable information terminal. The wireless terminal includes an acquisition unit for acquiring function information indicating a plurality of programs contained in the portable information terminal from the portable information terminal and a launch instruction unit for, in response to selection of a program of a plurality of programs indicated by the function information acquired by the acquisition unit, transmitting to the portable information terminal a launch instruction signal for instructing to launch the selected program. The portable information terminal includes a processing unit for starting execution of a program whose launch is instructed by the launch instruction (Continued)

signal following reception of the launch instruction signal from the wireless terminal.

26 Claims, 12 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 9,027,117 | B2* | 5/2015 | Wilairat | G06F 21/36 726/17 |
| 2009/0034591 | A1 | 2/2009 | Julian et al. | |
| 2012/0316777 | A1 | 12/2012 | Kitta | |
| 2013/0111342 | A1* | 5/2013 | Alameh | G06F 3/0488 715/702 |
| 2013/0198392 | A1* | 8/2013 | Hymel | G06F 3/013 709/227 |
| 2014/0045547 | A1* | 2/2014 | Singamsetty | G06F 1/1643 455/552.1 |
| 2014/0096024 | A1* | 4/2014 | Laurent | G06F 21/128 715/739 |

FOREIGN PATENT DOCUMENTS

| | | |
|---|---|---|
| JP | 2007-019748 A | 1/2007 |
| JP | 2007251565 A | 9/2007 |
| JP | 2011-166585 A | 8/2011 |
| KR | 1020100049623 A | 5/2010 |

OTHER PUBLICATIONS

Sony Support, "How do I set up SmartWatch with my Android phone," Oct. 9, 2012, Sony Mobile Communications, support.sonymobile.com/us/smartwatch/faq/how-do-i-set-up-smartwatch-with-my-android-phone-4/.*

Yatri Trivedi, "How to (Un)Lock Your PC by Being Nearby (With a Bluetooth Phone)," Jul. 7, 2011, How-to Geek, www.howtogeek.com/67556/how-to-unlock-your-pc-by-being-nearby-with-a-bluetooth-phone/.*

Making the Sony "SmartWatch MN2" with Xperia (and partial English translation thereof); Website URL:http://kunkoku.com/52007423.html; Apr. 10, 2012.

Japanese Office Action dated Jan. 19, 2015 (and English translation thereof), issued in counterpart Japanese Application No. 2013-057638.

Sony, "SmartWatch User guide," Sony Ericsson Mobile Communications AB [online], 2011, Internet <URL: http://www-support-downloads.sonymobile.com/mn2/userguide_EN_MN2_1258-0295.3.pdf>.

Korean Office Action (and English translation thereof) dated Mar. 26, 2015, issued in counterpart Korean Application No. 10-2013-0151021.

Chinese Office Action (and English translation thereof) dated Jun. 5, 2015, issued in counterpart Chinese Application No. 201310699677.

Korean Office Action dated Sep. 30, 2014, issued in counterpart Korean Application No. 10-2013-0151021.

* cited by examiner

FIG. 4
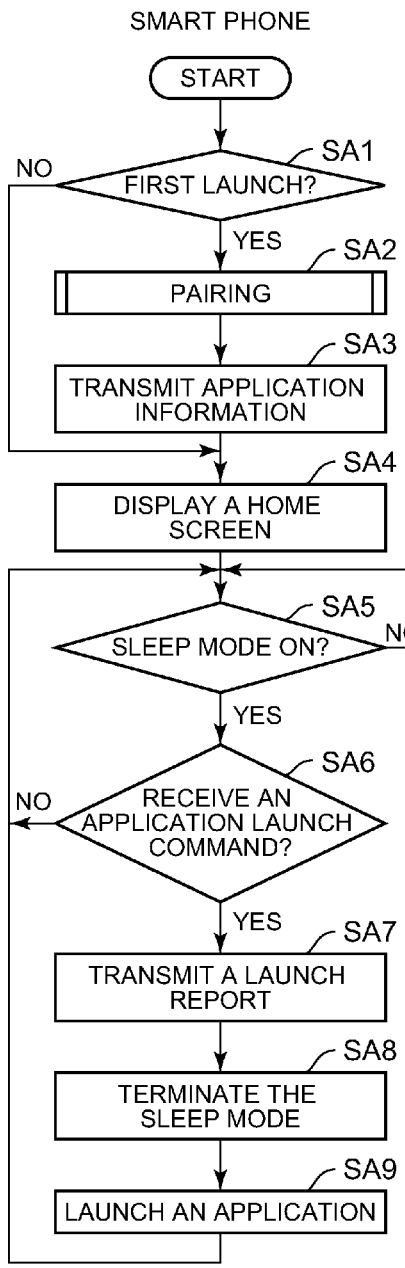
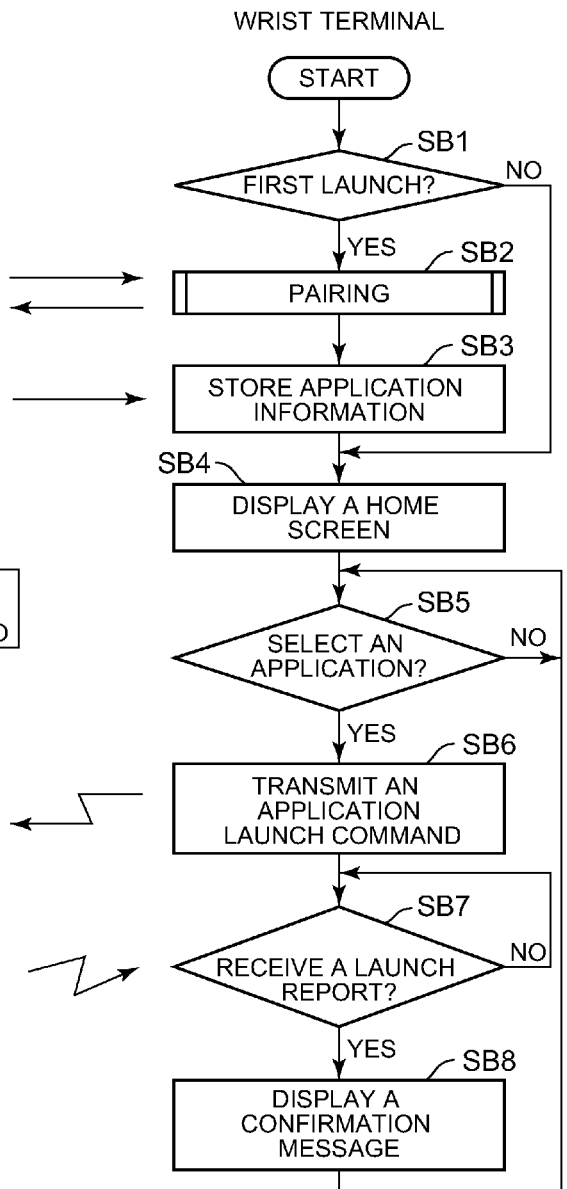

INFORMATION PROCESSING SYSTEM, WIRELESS TERMINAL, LAUNCHING METHOD OF PORTABLE INFORMATION TERMINAL AND COMPUTER READABLE RECORDING MEDIUM HAVING PROGRAM FOR CONTROLLING THEREOF

CROSS-REFERENCE TO RELATED APPLICATIONS

This application is based upon and claims the benefit of priority under 35 USC 119 of Japanese Patent Application No. 2013-057638 filed on Mar. 21, 2013, the entire disclosure of which, including the description, claims, drawings, and abstract, is incorporated herein by reference in its entirety. This application also is based upon and claims the benefit of priority under 35 USC 119 of Japanese Patent Application No. 2012-278262 filed Dec. 20, 2012.

BACKGROUND OF THE INVENTION

1. Field of the Invention

The present invention relates to a technique for improving launching performance when using a portable information terminal.

2. Description of the Related Art

As a conventional information processing system including a portable information terminal having a plurality of functions and a wireless terminal which wirelessly communicates with the portable information terminal, Japanese Patent Application Laid-Open Publication No. 2007-19748 published on Jan. 25, 2007, discloses, for example, a system including a portable information terminal having functions such as phone call, payment, address book, mail and the like, and a key unit. In this system, security is achieved by restricting use of all the functions of the portable information terminal (except call to 110 (emergency call) or the like) when a distance to the key unit is greater than or equal to a predetermined value.

In a smart phone that is currently popular as a portable information terminal, a touch panel is installed in a display unit, and various applications corresponding to icons can be launched by touching any of the icons arranged on a home screen when the home screen is displayed on the display unit.

Further, the smart phone is provided with a so-called sleep mode for stopping display of the home screen or the like in order to prevent careless launch of an application which is not intended by a user and wasteful power consumption. The smart phone is automatically switched to the sleep mode when there is no manipulation by a user as well as when there is no operation for a specific period of time.

SUMMARY OF THE INVENTION

According to one aspect of the present invention, an information processing system is provided. The information processing system includes a portable information terminal having a plurality of functions and a wireless terminal which wirelessly communicates with the portable information terminal. The wireless terminal includes an acquisition unit for acquiring function information indicating a plurality of programs contained in the portable information terminal, and a launch instruction unit for, in response to selection of a program of a plurality of programs indicated by the function information acquired by the acquisition unit, transmitting to the portable information terminal a launch instruction signal for instructing to launch the selected program. The portable information terminal includes a processing unit for starting execution of a program whose launch is instructed by the launch instruction signal following reception of the launch instruction signal from the wireless terminal.

According to another aspect of the present invention, a wireless terminal in an information processing system including a portable information terminal and the wireless terminal which wirelessly communicates with the portable information terminal is provided. The wireless terminal includes an acquisition unit for acquiring function information indicating a plurality of programs contained in the portable information terminal from the portable information terminal and a launch instruction unit for, in response to selection of a program of a plurality of programs indicated by the function information acquired by the acquisition unit, transmitting to the portable information terminal a launch instruction signal for instructing to launch the selected program.

According to another aspect of the present invention, a portable information terminal in an information processing system including the portable information terminal and a wireless terminal which wirelessly communicates with the portable information terminal is provided. The portable information terminal includes a transmission unit for transmitting function information indicating a plurality of programs to the wireless terminal and a processing unit for starting execution of a program following reception of a launch instruction signal from the wireless terminal, the launch instruction signal instructing to launch the program.

According to another aspect of the present invention, a method for starting a portable information terminal is provided. The method includes acquiring function information indicating a plurality of programs contained in a portable information terminal by a wireless terminal from the portable information terminal, in response to selection of a program of a plurality of programs indicated by the function information acquired from the portable information terminal, transmitting a launch instruction signal for instructing to launch the selected program to the portable information terminal by the wireless terminal, and starting execution of the program whose launch is instructed by the launch instruction signal by the portable information terminal.

According to another aspect of the present invention, a method for instructing launch by a wireless terminal is provided. The method includes acquiring function information indicating a plurality of programs contained in a portable information terminal from the portable information terminal; and, in response to selection of a program of a plurality of programs indicated by the function information acquired from the portable information terminal, transmitting a launch instruction signal for instructing to launch the selected program to the portable information terminal.

According to another aspect of the present invention, in an information processing system including a portable information terminal and a wireless terminal which wirelessly communicates with the portable information terminal, a computer readable recording medium which records a program is provided. The program makes a computer of the wireless terminal function as an acquisition unit for acquiring function information indicating a plurality of programs contained in the portable information terminal from the portable information terminal, and a launch instruction unit for, in response to selection of a program of a plurality of programs indicated by the function information acquired by the acquisition unit, transmitting to the portable information terminal a launch instruction signal for instructing to launch the selected program.

According to another aspect of the present invention, in an information processing system including a portable information terminal and a wireless terminal which wirelessly communicates with the portable information terminal, a computer readable recording medium which records a program is provided. The program makes a computer of the portable information terminal function as a transmission unit for transmitting function information indicating a plurality of programs to the wireless terminal, and a processing unit for starting execution of a program following reception of a launch instruction signal from the wireless terminal, the launch instruction signal instructing to launch the program.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 4 is a flow chart showing operations of a smart phone and a wrist terminal according to a first embodiment of the present invention;

DETAILED DESCRIPTION OF THE PREFERRED EMBODIMENT

Hereinafter, embodiments of the present invention will be described in detail with reference to the accompanying drawings. The technical scope of the present invention is not limited to the embodiments illustrated in the accompanying drawings.

(First Embodiment)

Figure 1:
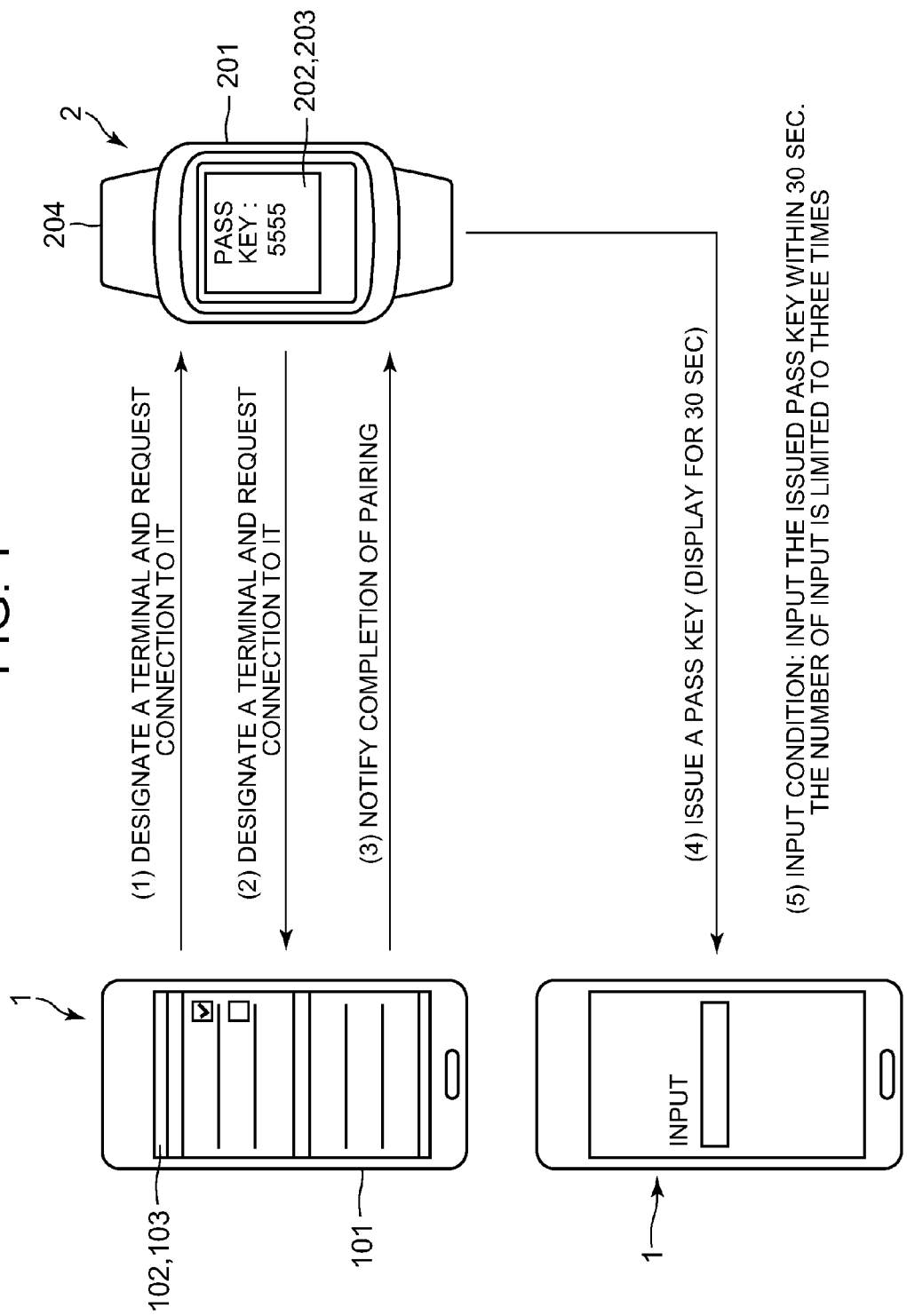
FIG. 1 is a top view showing a smart phone and a wrist terminal and also explains a pairing process, which is used in common to the embodiments of the present invention.

A first embodiment of the present invention will be described. FIG. 1 is a top view showing a system including a smart phone 1 to which the present invention is applied, and a wrist terminal 2 which can be wirelessly connected to the smart phone 1 through a local area network such as Bluetooth (Registered Trademark) or the like to communicate data with the smart phone 1. FIG. 1 is used in common for the first embodiment and other embodiments to be described later.

This smart phone 1 has the above described sleep mode as an operation mode, and also has a security lock function. The security lock function of the present embodiment is a general function of restricting use of all the functions of the smart phone 1 including launch of various application programs and phone call (except call to 110 or the like) by requesting input of a password or the like while displaying a home screen in the state where it is switched to the sleep mode.

As shown in FIG. 1, it is well known that the smart phone 1 includes a vertically elongated main body 101 and a display unit 102 and a touch panel 103 which are vertically elongated similarly to the main body 101 and disposed on the main body 101. The wrist terminal 2 is a wrist watch type terminal which can be fastened to a person's wrist and includes a case 201, a display unit 202 and a touch panel 203 disposed on the case 201, and a wrist band 204 attached to both of the ends of the case 201.

Figure 2:
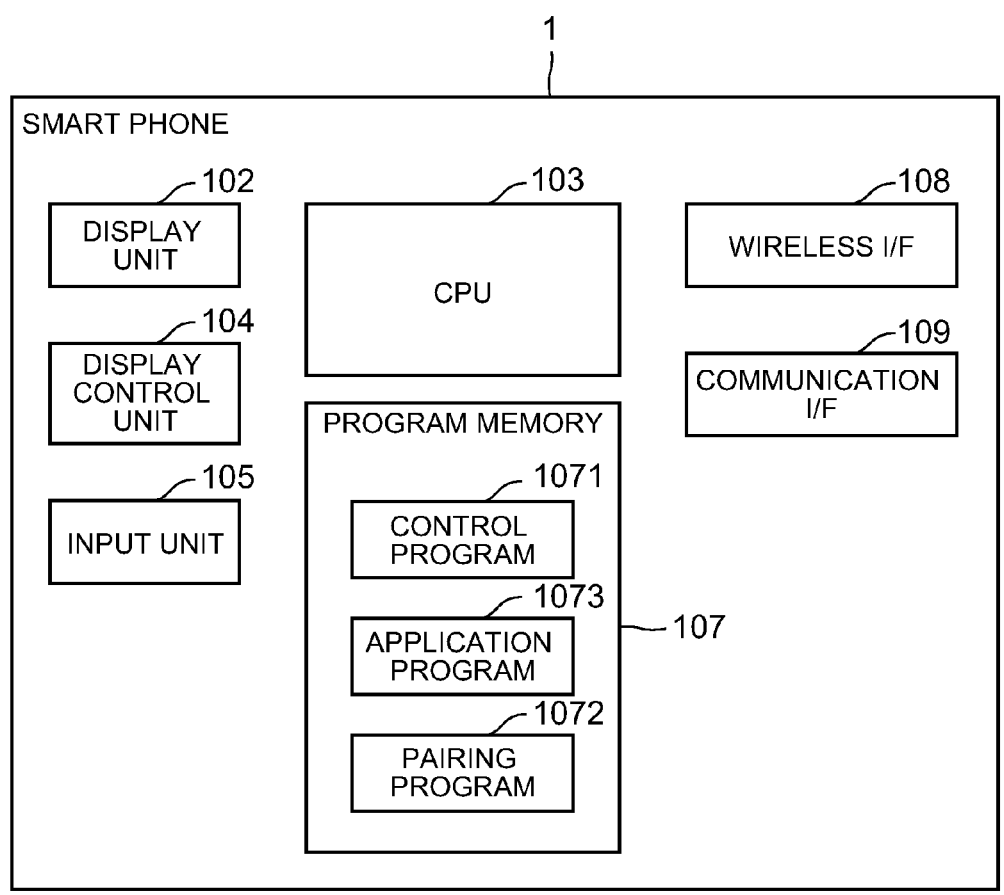
FIG. 2 is a schematic block diagram showing a circuit configuration of a smart phone which is used in common for the embodiments.

FIG. 2 is a block diagram showing a circuit configuration of the smart phone 1. A reference numeral 102 indicates the display unit having an LCD disposed as described above, a driving circuit for driving the LCD, and the like. A reference numeral 104 indicates a display control unit for controlling display states of the display unit 102. A reference numeral 105 indicates an input unit including various keys and switches. The touch panel 103 is also included in the input unit 105.

A reference numeral 106 indicates a CPU for controlling the smart phone 1. A reference numeral 107 indicates a program memory for storing a control program 1071, a paring program 1072, and the like as well as various application programs 1073. Particularly, in the present embodiment, the program memory 107 stores a predetermined application program (hereinafter, referred to as a "quick launch application") which enables the wrist terminal 2 to launch an application program.

The control program 1071 is a basic control program for controlling the whole smart phone 1, and the pairing program 1072 is a program for establishing pairing (an authentication procedure) with any wrist terminal 2. Further, the control program 1071 includes a mail program for writing, sending and receiving mails.

A reference numeral 108 indicates a wireless I/F for transmitting/receiving data to/from the wrist terminal 2 through a local area network. A reference numeral 109 is a communication I/F for establishing link with various servers on the Internet through Wi-Fi or the like. The servers include a server for providing various application programs (hereinafter, simply referred to as "applications") which is so-called an application store. The program memory 107 includes applications downloaded from the servers.

For telephone communication, the smart phone 1 also includes a voice input circuit for modulating an input voice, a transmission circuit for transmitting the modulated voice, a reception circuit for receiving and decoding a voice signal, a playback circuit for playing back the voice signal, or the like. Illustration and description of those circuits well-known in the art are omitted.

Figure 3:
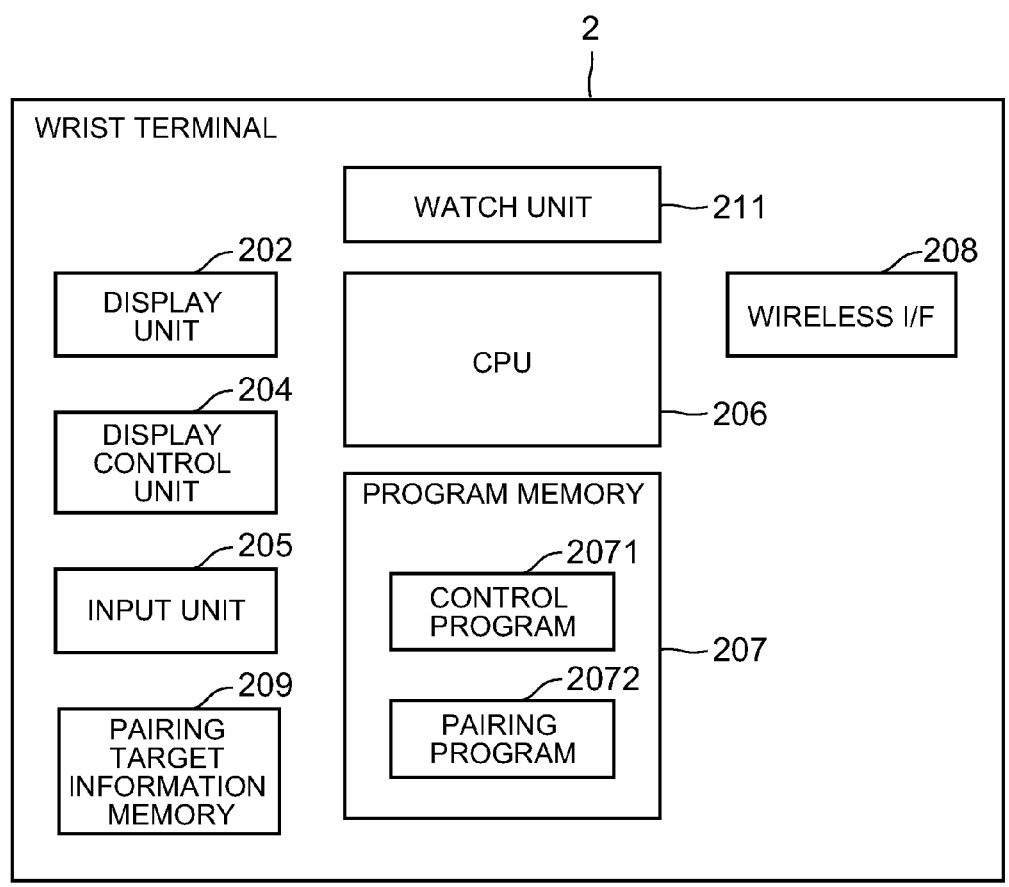
FIG. 3 is a schematic block diagram showing a circuit configuration of a wrist terminal which is used in common for the embodiments.

FIG. 3 is a schematic block diagram showing a circuit configuration of the wrist terminal 2. The wrist terminal 2 has a very similar configuration as that of the smart phone 1 except that it includes a watch unit 211. A reference numeral 202 indicates the display unit including an LCD, a driving circuit for driving the LCD, or the like. A reference numeral 204 indicates a display control unit for controlling display states of the display unit 202. A reference numeral 205 indicates an input unit including various keys or switches. The touch panel 203 is included in the input unit 205.

A reference numeral 206 indicates a CPU for controlling the whole wrist terminal 2. A reference numeral 207 indicates a program memory in which a control program 2071 and a pairing program 2072 are stored in advance. The control program 2071 is a basic control program for controlling the whole wrist terminal 2, and the pairing program 2072 is a program for establishing pairing with the smart phone 1. A reference numeral 208 indicates a wireless I/F for establishing wireless link with the smart phone 1.

A reference numeral 209 indicates a pairing target information memory for storing information of applications stored in the smart phone 1 that has been paired with the wrist terminal 2 (hereinafter, referred to as "application information"), i.e., information of the functions of the smart phone 1, or the like.

Then, operations of the present embodiment will be described based on the flow charts.

FIG. 4 is a flow chart showing operations of the smart phone 1 and the wrist terminal 2 in the case that the quick launch application is launched in the smart phone 1 by a user.

As shown in FIG. 4(a), the smart phone 1 starts its operation simultaneously with the launch of the quick launch application. If the launch is not the first launch (step SA1: NO), the smart phone 1 immediately displays a home screen on the display unit 102 (step SA4). The home screen is a screen where a plurality of icons corresponding to the plurality of application programs 1073 stored in the program memory 107 and the like are arranged.

If it is the first launch (step SA1: YES), a pairing process is performed between the smart phone 1 and the wrist terminal 2 (step SA2). Here, the first launch means that the quick launch application is launched when the wrist terminal 2 is not registered as an authenticated terminal in the smart phone 1 yet. Correspondingly, as shown in FIG. 4B, when the wrist terminal 2 is turned on and the quick launch application in the smart phone 1 is launched for the first time (step SB1: YES), a pairing process is performed between the smart phone 1 and the wrist terminal 2 (step SB2).

In other words, according to the present embodiment, the smart phone 1 serves as a master and the wrist terminal 2 serves as a slave. By this, the pairing between them is performed.

Figure 5:
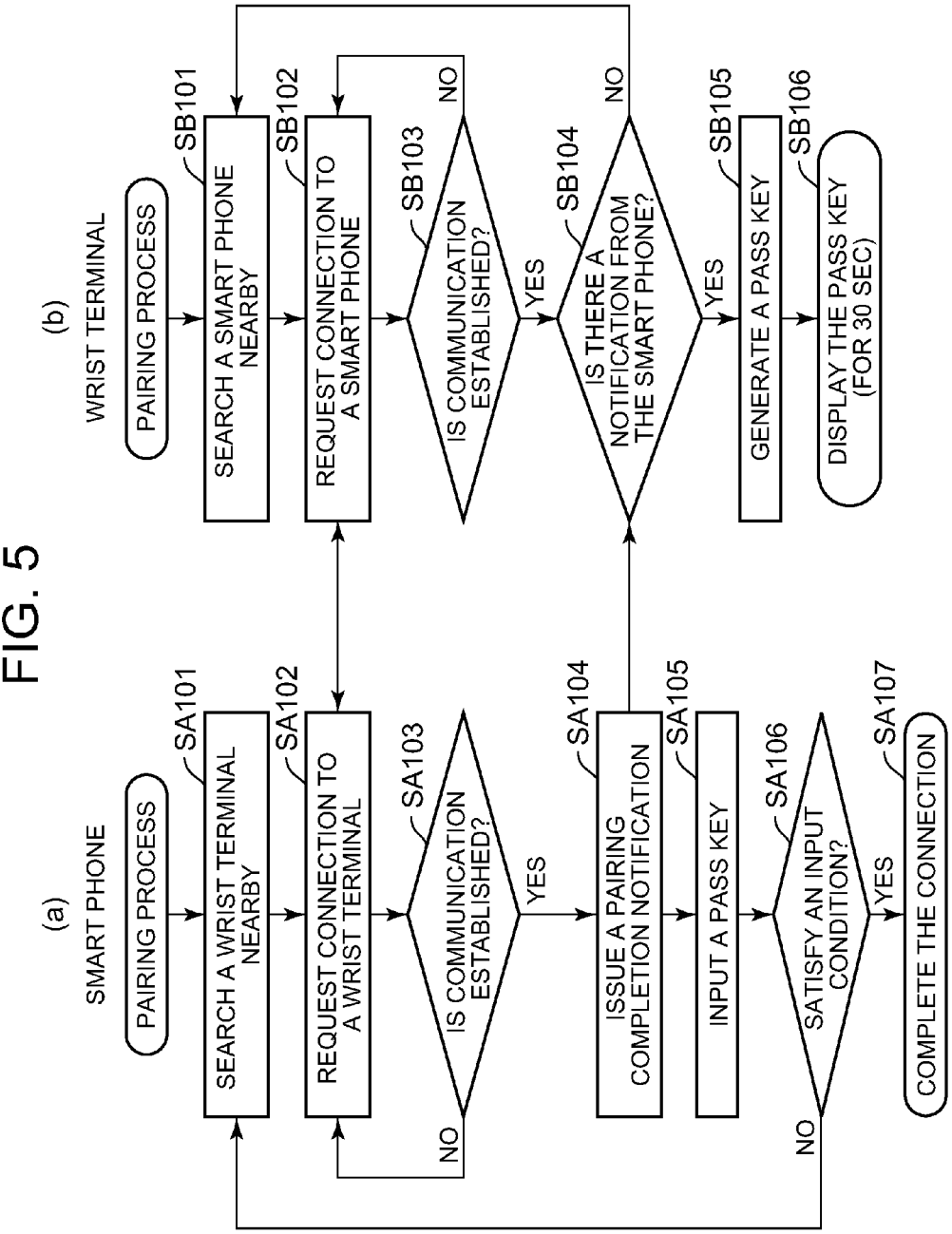
FIG. 5 is a flow chart showing a pairing process of the smart phone and the wrist terminal.

FIG. 5 is a flow chart showing a pairing process between the smart phone 1 and the wrist terminal 2 according to the present embodiment. As shown in FIG. 5A, the smart phone 1 is configured to communicate via Bluetooth (or Wi-Fi) and searches a wrist terminal 2 which is close to itself and can support short-distance wireless communication (step SA101).

As shown in FIG. 5B, the wrist terminal 2 is also configured to communicate via Bluetooth (or Wi-Fi) and searches a smart phone that is close to itself and can support short-distance wireless communication (step SB101). At this time, if the wrist terminal 2 and the smart phone 1 of the user which are not paired are located close to each other, each of the smart phone 1 and the wrist terminal 2 repeats transmission and reception by the short-distance wireless communication and searches a counterpart device close to itself.

After completing the search of the counterpart device close to itself, the smart phone 1 transmits a connection request to the wrist terminal 2 (step SA102, FIG. 1(1)), and the wrist terminal 2 transmits a connection request to the smart phone 1 (step SB102, FIG. 1(2)). Then, each of them determines whether or not two-way communication is established by the connection requests (steps SA103 and SB103). If the two-way communication by the connection requests is established (step SA103: YES), the smart phone 1 issues a pairing completion notification to the wrist terminal 2 (step SA104, FIG. 1(3)). The wrist terminal 2 determines whether or not a pairing completion notification is received from the smart phone 1 (step SB104).

After the two-way communication with the smart phone 1 is established (step SB103: YES) and then the pairing completion notification is received (step SB104: YES), the wrist terminal 2 generates a pass key and displays it on the display unit 202, for example, for about 30 seconds (step SB105, FIG. 1(4)). The user of the smart phone 1 and the wrist terminal 2 visually recognizes the pass key displayed on the display unit 202 of the wrist terminal 2 and inputs the pass key by manipulating keys included in the input unit 105 of the smart phone 1. Then, the input unit 105 of the smart phone 1 inputs the pass key into the CPU 106 (step SA105).

Next, the smart phone 1 determines whether or not the input pass key satisfies an input condition. For example, the input condition is whether or not the issued pass key is input within about 30 seconds, as shown in FIG. 1(5). Further, the limit of the number of input may be three times. If the input condition is not satisfied (step SA106: NO), the process returns to the step SA101.

If the input condition is satisfied (step SA106: YES), the connection is completed (step SA107). Accordingly, the communication is automatically configured using the pass key as identification information so as to allow the smart phone 1 and the wrist terminal 2 which are paired (i.e., mutually authenticated) to communicate between each other.

After the completion of the pairing, the smart phone 1 transmits application information to the wrist terminal 2 (step SA3). The application information transmitted to the wrist terminal 2 is information related to a plurality of application programs 1073 stored in the program memory 107 of the smart phone 1. The application information can be identification information and icon data (image data) of each of the applications.

Then, the smart phone 1 displays the home screen on the display unit 102 (step SA4). Next, the quick launch application is running in the background of the smart phone 1 and the smart phone 1 performs steps after the step SA5 in parallel with other operations.

Meanwhile, if the application information is transmitted from the smart phone 1 during a waiting state of the wrist terminal 2, the wrist terminal 2 stores it in the pairing target information memory 209 (step SB3). Next, the wrist terminal 2 displays a home screen G on the display unit 202 as shown in FIG. 6(a) (step SB4). Similarly to the home screen (not shown) of the smart phone 1, a plurality of icons P1, P2 and P3 indicating a plurality of applications, respectively, are arranged on the home screen G of the wrist terminal 2. Each of the icons P1, P2, and P3 is based on the icon data which is included in the application information stored in the pairing target information memory 209.

Further, a plurality of icons P1, P2, P3 . . . displayed on the wrist terminal 2 are selected from the icons displayed on the home screen of the smart phone 1. For example, in the case that the number of icons to be displayed on the wrist terminal 2 is four, the wrist terminal 2 displays on the home screen four icons selected as one group in the order of registration among the applications of the smart phone 1.

At this time, if there are icons which cannot be displayed on the home screen G for want of display space, N groups of icons arranged on the home screen of the smart phone 1 are alternately displayed on the home screen G on a group basis (for example, four at a time) in accordance with a predetermined manipulation of the user. A plurality of icons on the display screen of the wrist terminal 2 can be scrolled.

In other words, the icons can be alternately displayed one by one in accordance with a predetermined manipulation of the user.

If a launch of the quick launch application in the smart phone 1 is not the first launch (step SB1: NO), i.e., if the application information is already stored in the pairing target information memory 209 and the smart phone 1 and the wrist terminal 2 has been paired, the wrist terminal 2 is turned on and displays the home screen G on the display unit 202.

Then, the wrist terminal 2 constantly checks whether or not an icon arranged on the home screen G is selected by the user (step SB5). Here, the user selects an icon with one-touch on the home screen G (touch panel 203) as shown in FIG. 6A.

If an icon is selected (step SB5: YES), the wrist terminal 2 transmits to the smart phone 1 a command for launch of an application corresponding to the icon together with identification information of the application (step SB6). In other words, the wrist terminal 2 transmits to the smart phone 1 a launch instruction signal for instructing to launch the application corresponding to the icon.

Meanwhile, after displaying the home screen in the step SA4, for example, the smart phone 1 waits without performing any operation of the quick launch application while it is not switched to the sleep mode (step SA5: NO).

When the smart phone is switched to the sleep mode, for example, by a specific manipulation by the user or without any manipulation for a predetermined period of time, and is in the sleep mode, i.e., while the display of the home screen is being stopped (step SA5: YES), the smart phone 1 checks whether or not the launch command is received from the wrist terminal 2 (step SA6).

When receiving the launch command from the wrist terminal 2 (step SA6: YES), the smart phone 1 transmits a launch report to the wrist terminal 2 in response thereto (step SA7). Then, the smart phone 1 immediately terminates (releases) the sleep mode and restarts the display of the home screen (step SA8). Next, the smart phone 1 launches an application which is identified by the identification information received with the launch command (step SA9).

If the security lock function of the smart phone 1 is active when the launch command is received from the wrist terminal 2, the smart phone 1 releases the security lock function and terminates the sleep mode to start an operation of the application designated by the user. After that, the smart phone 1 returns to the step SA5.

Figure 6:
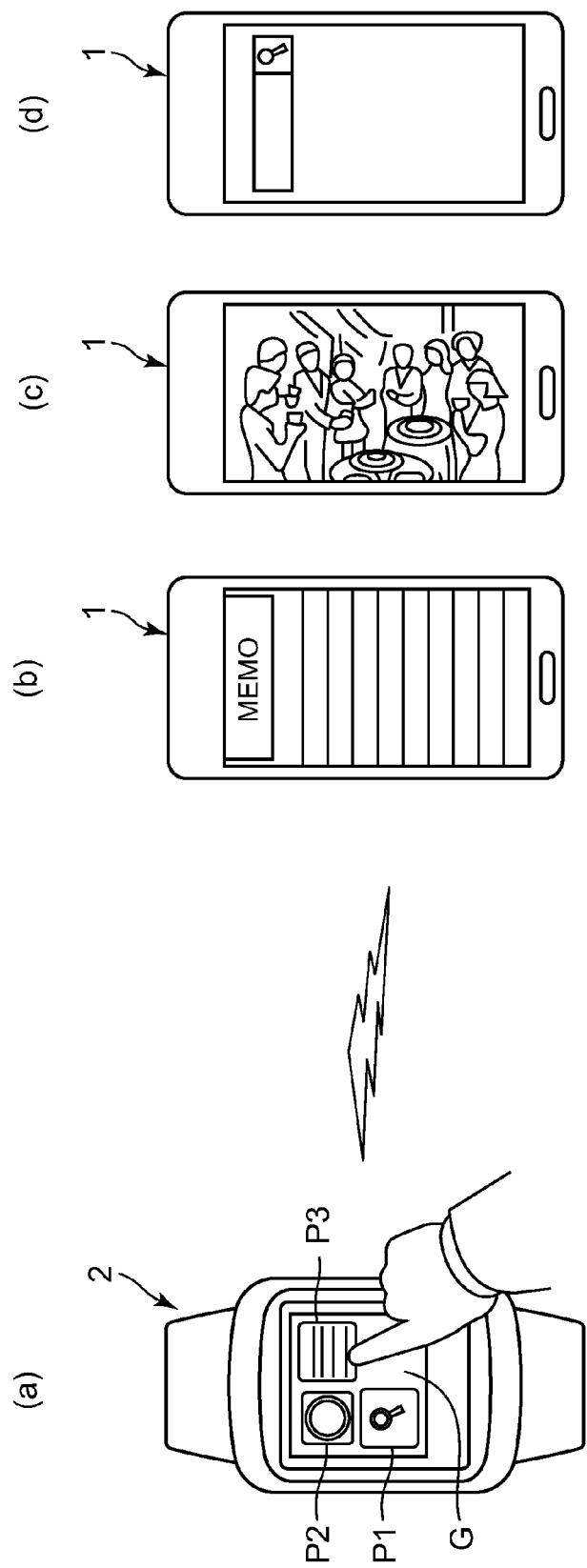
FIG. 6 shows an exemplary use of the smart phone in a sleep state according to the first embodiment of the present invention.

FIGS. 6(*b*) to 6(*d*) show the states in which applications in the smart phone 1 are launched, for convenience of understanding. FIG. 6(*a*) shows an example of the home screen G of the wrist terminal 2 which displays the icon P1 indicating a memo pad application, the icon P2 indicating a camera application and the icon P3 indicating a net search application. FIG. 6(*b*) shows the launch state of the memory pad application. FIG. 6(*c*) shows the launch state of the camera application. FIG. 6(*d*) shows the launch state of the net search application.

The smart phone 1 skips the step SA9 when the application identified by the identification information transmitted from the wrist terminal 2, i.e., the application whose launch is instructed by a user, is already running, although this is omitted from FIG. 4.

After that, the smart phone 1 repeats the steps SA7 to SA9 if it is switched to the sleep mode.

If the launch report is received from the smart phone 1 (step SB7: YES), the wrist terminal 2 displays on the display unit 102 a confirmation message informing the user of the launch of the application selected by the user in the smart phone 1 (step SB8). Then, the wrist terminal 2 returns to the step SB5 and repeats the above operations.

For convenience, the present specification describes the embodiments on the premise that the launch report can be received from the smart phone 1 at any time. However, when the launch report cannot be received, for example, when the communication with the smart phone 1 fails, the wrist terminal 2 repetitively transmits the application launch command. Further, when the launch report cannot be received from the smart phone 1 even after the number of transmission of the launch command reaches a predetermined number, the wrist terminal 2 displays on the display unit 102 an error message informing the user of this problem.

As described above, in the system of the present embodiment, when the smart phone 1 and the wrist terminal 2 are paired, the application information of the smart phone 1 is acquired by the wrist terminal 2. Accordingly, a user can select by the wrist terminal 2 any of the applications in the smart phone 1 as a launch target.

Further, while the smart phone 1 is in the sleep state, the user can instruct launch of an application by the wrist terminal 2, thereby terminating the sleep mode of the smart phone 1 and launching the application.

When the security lock function is active, the smart phone can release the security lock function and terminate the sleep mode to launch the application.

Therefore, the user can immediately launch an application from the wrist terminal 2 without any manipulations for releasing the sleep state to display the home screen, or, in some cases, without complicated manipulations such as input of a password or the like, unlike the situation where the user takes the smart phone 1 out of a bag, a pocket, or the like, in order to use the application. As a result, according to the system of the present embodiment, the launching performance when using the smart phone 1 can be improved.

According to the present embodiment, the transmission and reception of the application information between the smart phone 1 and the wrist terminal 2 is performed immediately after the quick launch application is launched for the first time in the smart phone 1 and the pairing process between them is performed. However, the transmission and reception of the application information may also be performed in the following case.

For example, the transmission and reception of the application information may be automatically performed when a plurality of application programs 1073 stored in the program memory 107 are changed, for example, when a new application is stored in the program memory 107 of the smart phone 1, during the running of the quick launch application in the smart phone 1. In this case, the groups of icons displayed on the home screen of the wrist terminal 2 may always coincide with the plurality of applications of the smart phone 1.

Further, according to the present embodiment, when the user instructs the wrist terminal 2 to launch of an application, the smart phone 1 releases the security lock function if it is active and terminates the sleep mode to launch the application.

However, the present invention can be implemented so that, when the security lock function of the smart phone 1 is active, the application launch instruction by the wrist terminal 2 (i.e., the user) may become invalid without releasing the security lock function. In this case, the present invention can improve the launching performance when using the smart phone 1 of which security lock function is inactive compared to the conventional technologies.

Contrary to this case, when there is a launch instruction of an application from the wrist terminal 2 in a state where the security lock function of the smart phone 1 is active, the smart phone 1 requests lock release data for releasing the security lock to the wrist terminal 2 and launch the application when the lock release data is received. Here, the lock release data includes, for example, password data or of touch pattern data.

In this case, if the smart phone 1 requests the lock release data to the wrist terminal 2, operations can be performed to request the user to input a password or a touch pattern by drawing a predetermined trajectory on a screen and to allow the wrist terminal to transmit the input lock release data.

Further, the present invention can be implemented so that, when the security lock function is active, the user can preset whether the smart phone 1 will release the security lock function. For example, the quick launch application may have a function of setting an operation to be performed when the security lock function is active, i.e., whether to or not to release the security lock function.

The above description explains an example in which when the number of icons displayed on the home screen by the wrist terminal 2 is four, the wrist terminal 2 displays four icons in the order of registration as one group on the home screen. However, the wrist terminal 2 may perform a process of grouping a plurality of applications of the smart phone 1 in advance and display only icons corresponding to applications belonging to a group designated by the user on the home screen. Further, the applications may be grouped in advance, for example by the user, or may be automatically performed when the application information is received from the smart phone 1 and stored.

At that time, change of icons on the home screen may be performed, for example, by changing a group of icons to be displayed in response to the user's vertical flick (movement of a finger) on the home screen and changing icons to be displayed to a different icon in the same group in response to the user's horizontal flick on the home screen.

As described above, the user can easily select an application (icon) of a large number of applications contained in the smart phone 1 by allowing the wrist terminal 2 to group the applications of the smart phone 1 and display a plurality of icons belonging to one group on the home screen of the wrist terminal 2.

As described above, the smart phone 1 operates according to the pairing program 1072 stored in the program memory 107 and is paired with the wrist terminal 2. However, this operation of the smart phone 1 may also be performed by a predetermined application program 1073 stored by a user in the program memory 107, for example, an application downloaded and installed from a commercial download site on the Internet.

In that case, the present invention can be implemented even by using, as the smart phone 1, a conventional one which is not equipped with the pairing program 1072. Further, the smart phone 1 and the wrist terminal 2 can be paired by using any communication method including a dedicated communication method as well as a general one, which extends the range of the wrist terminal 2 available for this purpose.

In the above description, the smart phone 1 is an example of an information processing apparatus of the present invention, and the wrist terminal 2 is an example of a wireless communication device of the present invention. However, in the present invention, the smart phone 1 can be substituted with another information processing apparatus such as a laptop PC, a desktop PC, or the like. The wrist terminal 2 can also be substituted with another wireless terminal such as a smart phone or the like. It is desirable that the user can wear the wireless terminal such as the wrist terminal 2.

(Second Embodiment)

Next, a second embodiment of the present invention will be described. The present embodiment relates to a system including a smart phone 1 and a wrist terminal 2 having the configurations shown in FIGS. 2 and 3, respectively. The smart phone 1 and the wrist terminal 2 perform operations to be described below.

Figure 7:
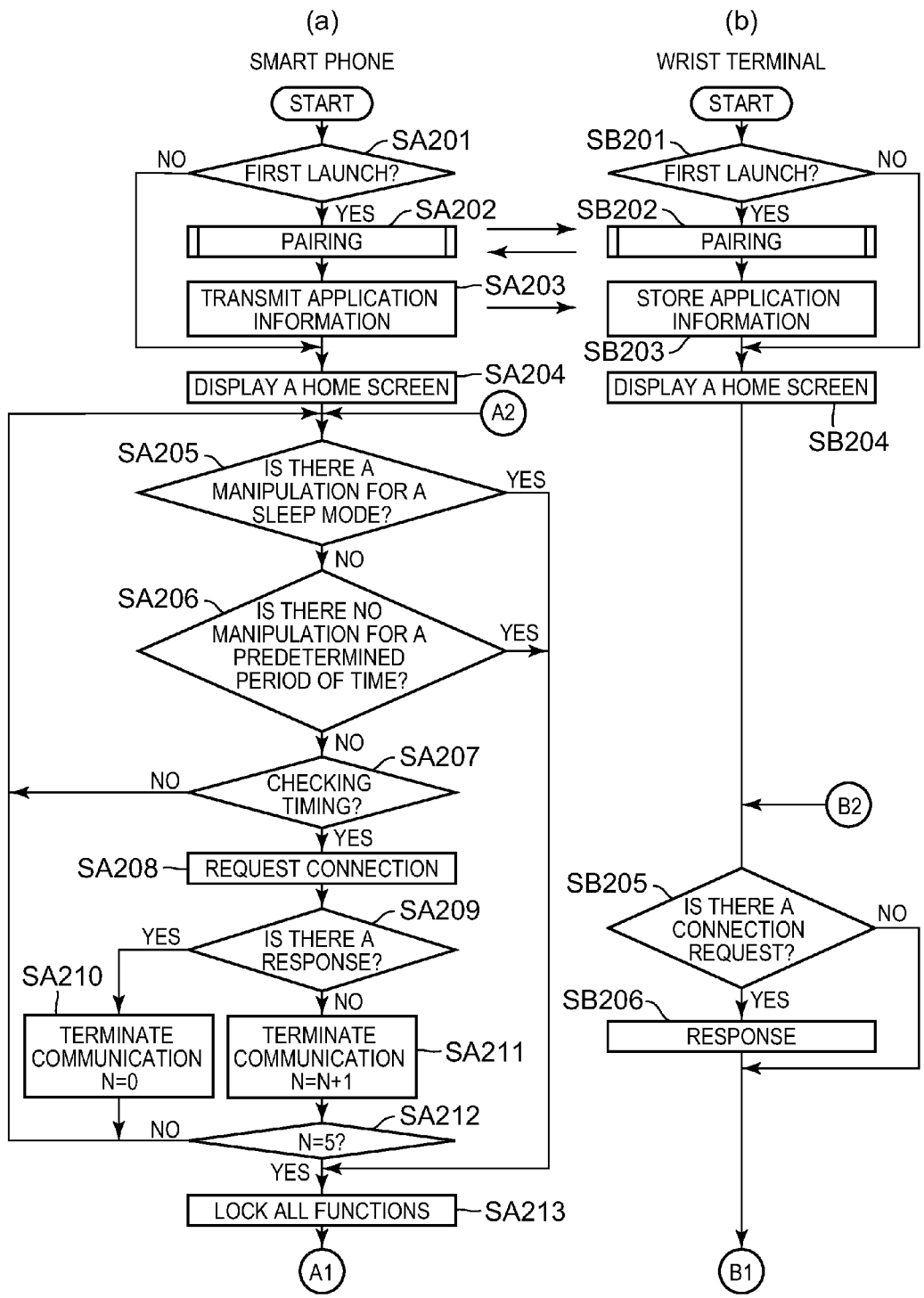
FIG. 7 is a flow chart showing operations of a smart phone and a wrist terminal according to a second embodiment of the present invention.

FIG. 7 is a flow chart showing operations of the smart phone 1 and the wrist terminal 2 according to the present embodiment, and shows operations when the quick launch application is launched by the user in the smart phone 1.

FIG. 7(a) is a flow chart showing operations of the smart phone 1. The processes of the steps SA201 to SA204 are similar to the processes of the steps SA1 to SA4 in FIG. 4(a) described with respect to the first embodiment. FIG. 7(b) is a flow chart showing operations of the wrist terminal 2. The processes of the steps SB201 to SB204 are similar to the processes of the steps SB1 to SB4 in FIG. 4(b) described with respect to the first embodiment.

In other words, like the first embodiment, when the quick launch application is launched in the smart phone 1, a pairing process between the smart phone 1 and the wrist terminal 2 is performed, if necessary, and the application information (identification information of a plurality of applications and icon data) is transmitted from the smart phone 1 to the wrist terminal 2.

Next, the smart phone 1 and the wrist terminal 2 display home screens, respectively. At this time, in the present embodiment, when the home screen G as shown in FIG. 6a is displayed on the display unit 202 (step SB204), the wrist terminal 2 displays a plurality of icons in the order of registration.

Then, the wrist terminal 2 is registered as an authenticated terminal in the smart phone 1. While a plurality of applications of the smart phone 1 are registered in the wrist terminal 2 and the wrist terminal displays the home screen, the smart phone 1 and the wrist terminal 2 operate as will be described below.

First, the smart phone 1 checks whether or not there was a sleep manipulation by the user (a manipulation for switchover to the sleep mode) and whether or not there was no manipulation for a predetermined period of time. If there is the user's sleep manipulation (step SA205: YES) or there is no manipulation for a predetermined period of time (step SA206: YES), the smart phone 1 is immediately switched to the sleep mode in which the display of the home screen is stopped and becomes a lock state in which all the functions are locked, i.e., a security lock state (step SA213).

While the smart phone 1 is not switched to the lock state, the smart phone 1 transmits the connection request for starting communication to the wrist terminal 2 (step SA208) at every checking timing of a predetermined interval (step SA207: YES). According to the present embodiment, the predetermined interval is about one minute.

Meanwhile, as shown in FIG. 7(b), after the home screen is displayed, the wrist terminal 2 constantly checks whether or not the connection request is received from the smart phone 1. If the connection request is received (step SB205: YES), the wrist terminal 2 responds to it immediately (step SB206). When the response from the wrist terminal 2 is confirmed (step SA209: YES), i.e., when it is confirmed that communication with the wrist terminal 2 is possible, the smart phone 1 immediately ends the communication and resets the check number N to zero (step SA210) and returns to the step SA205. The check number N indicates the number of times when there is no response from the wrist terminal 2, as will be described later.

When there is no response from the wrist terminal 2 (step SA209: NO) after the transmission of the connection request for starting communication to the wrist terminal 2, i.e., when it is confirmed that communication with the wrist terminal 2 fails, the smart phone 1 immediately ends the communication and increases the check number N (step SA211).

Then, the smart phone 1 checks whether or not the check number is five (step SA212). In other words, it is checked whether or not the state in which communication with the wrist terminal 2 fails continues for a predetermined period of time (here, at least about 4 minutes). When the check number N has not reached five (step SA212: NO), the smart phone 1 returns to the step SA205 and repeats the above described operations.

If the response from the wrist terminal 2 is confirmed as described above (step SA209: YES), the smart phone 1 resets the check number N to zero at that timing (step SA210). When the check number N reaches five during repetition of the above described processes (step SA212: YES), the smart phone 1 is immediately switched to the lock state (security lock state) (step SA213).

Then, as shown in FIG. 8(a), the smart phone 1 constantly checks whether or not a launch instruction signal is received from the wrist terminal 2 (step SA214).

Meanwhile, as shown in FIG. 8(b), the wrist terminal 2 constantly checks whether or not the user selects an icon arranged on the home screen while it is paired and in the waiting state (step SB207). Here, the selection of the icon by the user is performed by touching once the home screen (touch panel 203), as shown in FIG. 6(a).

When an icon is selected (step SB207: YES), a launch instruction of an application corresponding to the icon is transmitted to the smart phone 1 together with identification information of the application (step SB208). In other words, the launch instruction signal for instructing to launch the application corresponding to the icon is transmitted to the smart phone 1.

When receiving the launch instruction signal from the wrist terminal 2 (step SA214: YES), the smart phone 1 transmits a launch report to the wrist terminal 2 in response to the reception (step SA215). Then, the smart phone 1 immediately releases the security lock function and terminates the sleep mode (step SA216). Then, it stars operations of the selected application (step SA217).

The launching states of the application in the smart phone 1 at this time are the same as those of FIGS. 6(b) to 6(d) described with respect to the first embodiment. The smart phone 1 skips the step SA217 when an application indicated by the launch instruction signal (identification information) received from the wrist terminal 2, i.e., an application whose launch is instructed by the user, is already running although this is omitted from FIG. 8.

Next, the smart phone 1 returns to the step SA205. Specifically, the smart phone 1 performs a predetermined operation of the application while repetitively performing the processes of the steps SA205 to SA212.

Meanwhile, after transmitting the launch instruction signal to the smart phone 1, the wrist terminal 2 checks whether or not a launch report signal for the launch instruction signal is received from the smart phone 1 (step SB209). Actually, related operations are repetitively performed within a predetermined period of time.

Here, when the launch report signal is not received, for example, the communication with the smart phone 1 fails (step SB209: NO), the wrist terminal 2 displays an error message informing this problem on the display unit 202 (step SB212) and returns to the step SB205.

When the launch report signal is received (step SB209: YES), the wrist terminal 2 displays on the display unit 102 for a predetermined period of time a confirmation message informing the user of the launch of the application selected by the user in the smart phone 1 (step SB210).

Then, the wrist terminal 2 renews arrangement of icons on the home screen (step SB211). In the present embodiment, the icons are arranged in the order or use, and the wrist terminal 2 displays on the home screen icons of applications in the order of recent use. Specifically, the wrist terminal 2 stores in advance final use dates of the icons (applications) and displays on the home screen a predetermined number of icons in the order of recent use.

Figure 9:
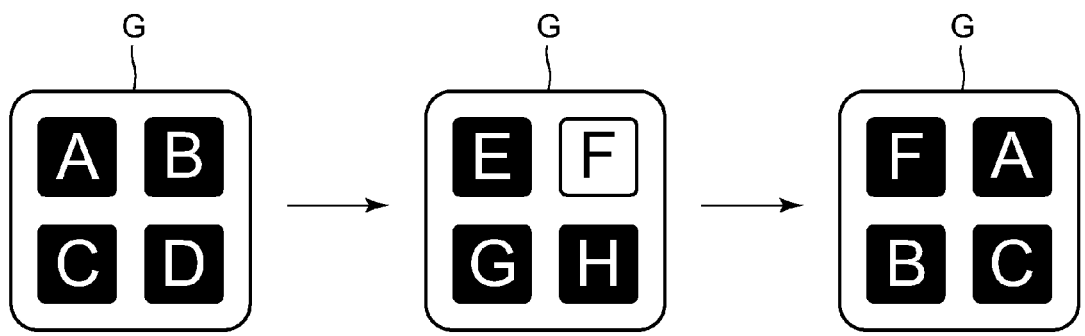
FIG. 9 is a transition diagram showing changes of a home screen of the wrist terminal according to the second embodiment of the present invention.

In other words, FIG. 9 is a transition diagram showing changes in display states of the icons and shows an example in which icons A, B, C and D are displayed on the home screen G (left end in the drawing). In this case, for example, if a user changes the icons on the home screen G to icons E, F, G and H and launches the icon (application) indicated by F (center in the drawing), the icons F, A, B and C are displayed on the home screen G as a result of the operation of the step SB211. Further, FIG. 9 shows an example in which the four icons are arranged in the order of date of use, from the left upper side, the right upper side, the right upper side and to the right lower side of the home screen G.

After the arrangement of the icons on the home screen is renewed as described above, the wrist terminal 2 returns to the step SB205 and repeats the above described operations.

As described above, according to the present embodiment, the smart phone 1 is switched to the security lock state when there was the user's manipulation for the sleep mode, there was no manipulation for a predetermined period of time, or the state in which communication with the wrist terminal 2 continues to fail for a predetermined period of time. However, the smart phone 1 irregularly checks, even while in the security lock state, whether or not the launch instruction signal is received from the wrist terminal 2. When receiving the launch instruction signal, the smart phone 1 automatically releases the security lock state and launches the application designated by the user.

Therefore, the system of the present embodiment also enables the user to launch an application from the wrist terminal 2 regardless of whether or not the smart phone 1 is in the security lock state. As a result, the launching performance when using the smart phone 1 can be improved while maintaining high security of the smart phone 1.

Further, according to the present embodiment, when the wrist terminal 2 displays a plurality of icons of applications contained in the smart phone 1 on the display unit 202, i.e., the home screen, it arranges the plurality of icons in the order of use and preferentially displays the icons of more recently used applications on the home screen.

Therefore, in the case of launching an application of the smart phone 1 from the wrist terminal 2, the user can immediately launch a recently used application without changing the icons displayed on the home screen. Accordingly, the launching performance when using the smart phone 1 can be further improved.

Moreover, the icons may be arranged on the home screen according to a criterion other than the order of date of use. For example, the present invention can be implemented so that the frequency of use of each of the icons (applications) is stored in the wrist terminal 2 and the icons may be arranged in descending order of number of times of use, i.e., in descending order of frequency of use. In this case, the launching performance when using the smart phone 1 can also be further improved.

(Third Embodiment)

Next, a third embodiment of the present invention will be described. This embodiment relates to a system including a smart phone 1 and a wrist terminal 2 having the configurations shown in FIGS. 2 and 3. In this system, specific information related to a specific application contained in the smart phone 1 is stored in advance by the user in the pairing target information memory 209 of the wrist terminal 2, and the smart phone 1 and the wrist terminal 2 perform the following operations in addition to the operations described with respect to the second embodiment.

Here, the specific information is information required by the smart phone 1 to start operation of an application and information required to be input by the smart phone 1 when the user launches the application by manipulating the smart phone 1. A specific example of the specific information is a single piece of or a plurality pieces of information such as a user ID or a password for login which is necessary to use services on the Internet (Internet banking or the like) if the application is used for connection to the services.

Figure 10:
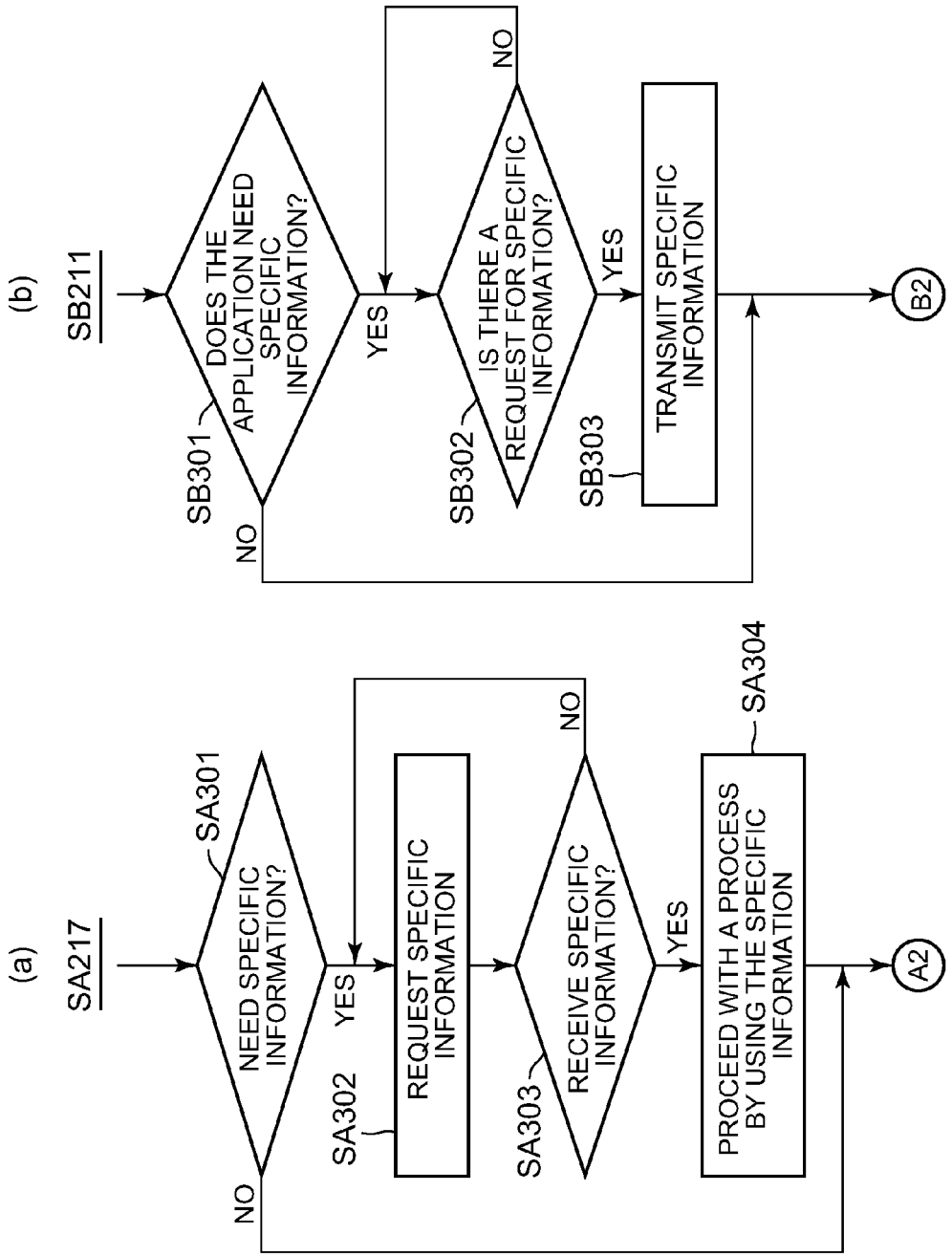
FIG. 10 is a flow chart showing operations of a smart phone and a wrist terminal according to a third embodiment of the present invention.

In the following, operations of the present embodiment will be described. FIG. 10(*a*) is a flow chart showing operations of the smart phone 1 which is continued from the step SA217 of FIG. 8(*a*). FIG. 10(*b*) is a flow chart showing operations of the wrist terminal 2 which is continued from the step SB211 of FIG. 8(*b*).

In the present embodiment, in the step SA217, the smart phone 1 launches the application whose launch is instructed from the wrist terminal 2. Then, if the specific information is required (step SA301: YES), a request signal that requests the transmission of the specific information is transmitted to the wrist terminal (step SA302).

In the case that the application launched is used for connection to the services on the Internet, for example, the specific information is required by the smart phone 1 when a server providing the services requests a password for login or the like.

In the step SB211, the wrist terminal 2 renews the arrangement of the icons. Then, if the application which the smart phone 1 is instructed to launch is an application which requires specific information at the time of launch in the smart phone 1 (step SB301: YES), the wrist terminal 2 waits until a signal for requesting the specific information is received from the smart phone 1 (step SB302: NO).

When the request signal is received (step SB302: YES), the wrist terminal 2 reads out the requested specific information from the pairing target information memory 209 and then transmits the read-out information to the smart phone 1 (step SB303).

Meanwhile, when receiving the specific information from the wrist terminal 2(step SA303: YES), the smart phone 1 continues to execute processes of the launched application by using the received specific information (step SA304). More specifically, for example, if the received specific information is a password for login, the smart phone 1 executes a login process.

Therefore, according to the system of the present embodiment, the user can launch an application from the wrist terminal 2 regardless of whether or not the smart phone 1 is in the security lock state, and, an input operation can be omitted even when it is required in order to use the application.

Although the present embodiment has described the configuration in which the wrist terminal 2 automatically transmits the specific information to the smart phone 1 in response to the request from the smart phone 1. However, the following configuration may also be employed.

For example, when the specific information is requested from the smart phone 1, the wrist terminal 2 displays on the display unit 102 an inquiry about whether or not to transmit the specific information and makes the user to answer whether or not to transmit the specific information by touching the screen of the display unit 102.

When the user allows the transmission, the wrist terminal 2 transmits the specific information to the smart phone 1. When the user does not allow the transmission, the wrist terminal 2 may stop the transmission of the specific information.

In this case, if the specific information cannot be received from the wrist terminal 2, the smart phone 1 may acts as conventional launch, i.e., waits input of the specific information.

According to the present embodiment, the specific information is transmitted and received between the smart phone 1 and the wrist terminal 2 at the point of time when the specific information is required in the smart phone 1 after the specific application is launched. However, unlike the present embodiment, the specific information may be transmitted to the smart phone 1 together with the launch instruction signal when the wrist terminal 2 transmits the launch instruction signal to the smart phone 1.

Further, in the above description, the password for login or the user ID used for connection to services such as internet banking was used as an example of the specific information. However, the specific information transmitted from the wrist terminal 2 to the smart phone 1 may be any information if the information is necessary for operations up to a predetermined step performed by an application selected by the user in the smart phone 1.

Further, the above described operations of the present embodiment may be performed in the system described in the first embodiment. Specifically, the operations of the smart phone 1 shown in FIG. 10(*a*) may be performed after the step SA9 of FIG. 4(*a*), and the operations of the wrist terminal 2 shown in FIG. 10(*b*) may be performed after the step SB8 of FIG. 4(*b*).

(Fourth Embodiment)

Next, a fourth embodiment of the present invention will be described. This embodiment also relates to a system including a smart phone 1 and a wrist terminal 2 having the configurations shown in FIGS. 2 and 3. However, in this embodiment, applications contained in the smart phone 1 include a predetermined application (hereinafter, referred to as a "specific application") having a function of reading or editing a file. Further, in the present embodiment, the smart phone 1 and the wrist terminal 2 performs the following operations in addition to the operations described in the second embodiment.

Figure 8:
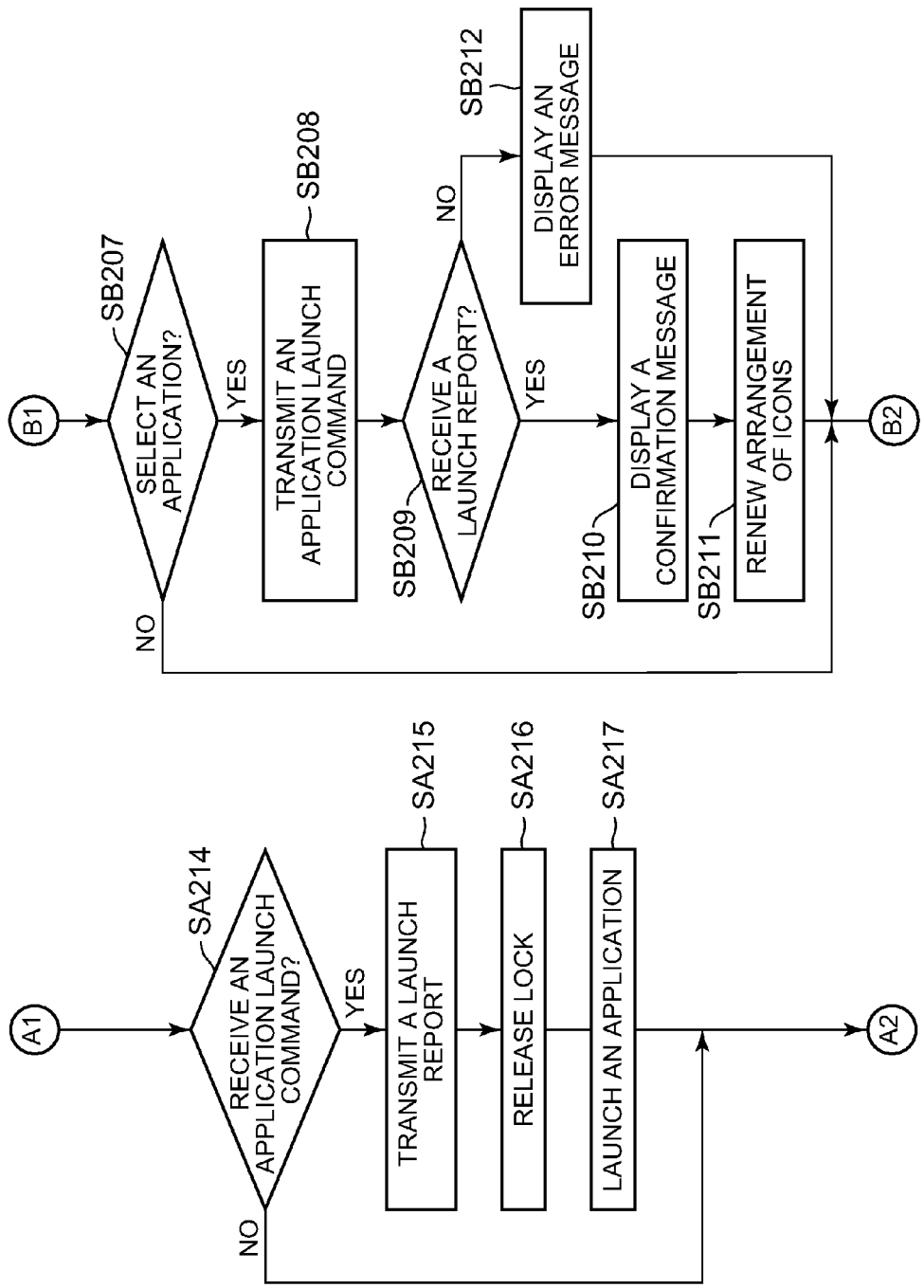
FIG. 8 is a flow chart continued from FIG. 7.
Figure 11:
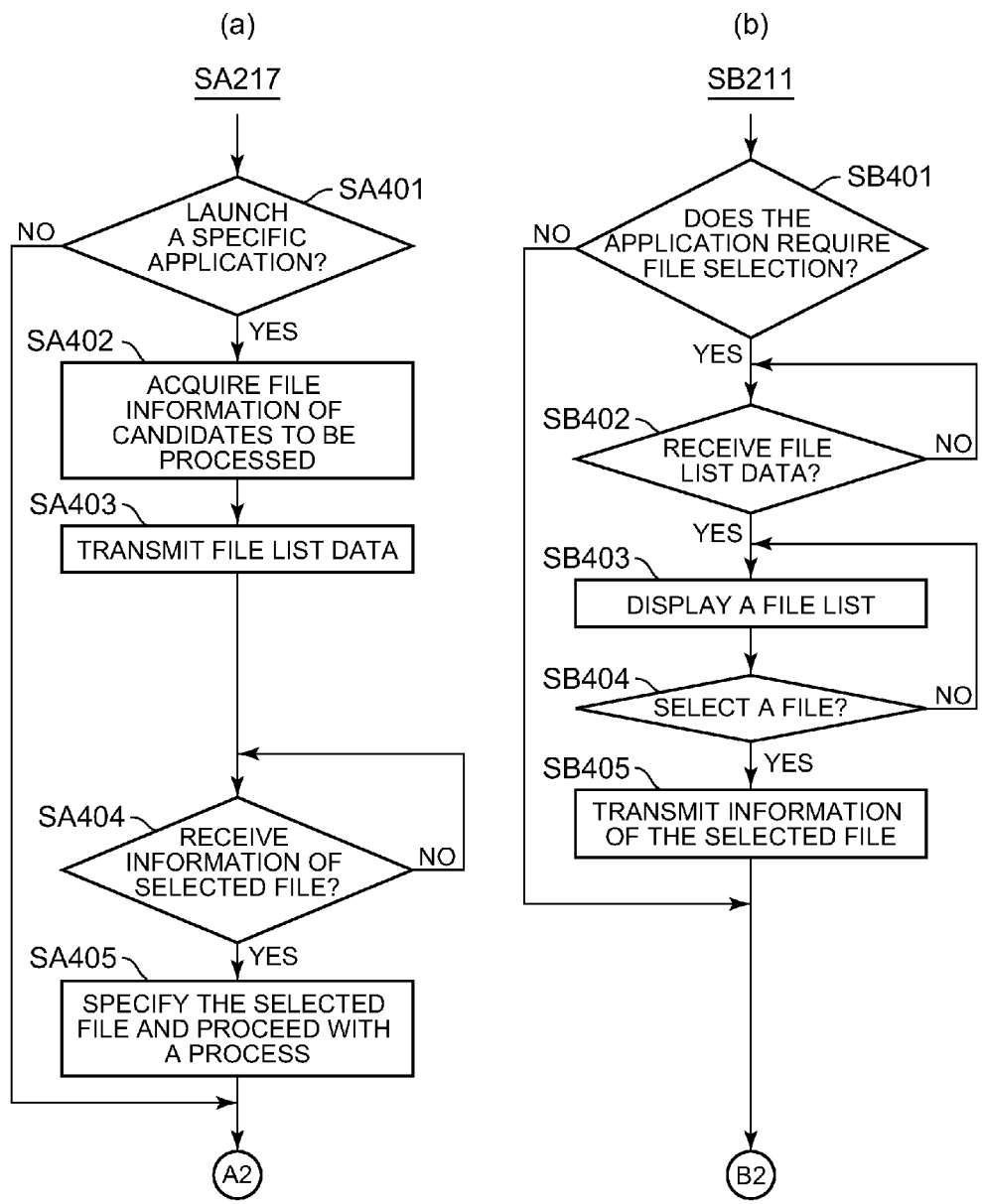
FIG. 11 is a flow chart showing operations of a smart phone and a wrist terminal according to a fourth embodiment of the present invention.

FIG. 11(*a*) is a flow chart showing operations of the smart phone 1 which is continued from the step SA217 of FIG. 8(*a*). FIG. 11(*b*) is a flow chart showing operations of the wrist terminal 2 which is continued from the step SB211 of FIG. 8(*b*).

In the present embodiment, in the step SA217, the smart phone 1 launches an application whose launch is instructed from the wrist terminal 2. Then, if the application is the specific application (step SA401: YES), the smart phone 1 acquires file information of candidates of a target to be processed (step SA402).

Further, in the present embodiment, files of the candidates of the processing target are stored in a user memory such as an embedded flash memory of the smart phone 1 (not shown in FIG. 2). Then, the smart phone 1 creates file list data of the candidates of the processing target and transmits the created data to the wrist terminal 2 (step SA403).

Then, the smart phone 1 waits reception of file information which is will be described later from the wrist terminal 2 (step SA404).

Meanwhile, after the renewal of the arrangement of the icons in the step SB211, the wrist terminal 2 waits until the file list data is received from the smart phone 1 (step SB402: NO) if the application whose launch is instructed to the smart phone 1 is the above specific application (step SB401: YES).

When receiving the file list data (step SB402: YES), the wrist terminal 2 displays the received file list data on the display unit 102 (step SB403). The wrist terminal 2 displays file names of the candidates of the processing target or the like on the display unit 102 in a list form.

Then, the wrist terminal 2 continues to display the file list until one or more of the files displayed in the list form are selected by the user (step SB404: NO). Although not illustrated, if there are files that cannot be displayed in the list on the screen, a plurality of files of the candidates of the processing target are alternately displayed or scrolled by a predetermined manipulation of the user.

Next, if a file is selected by the user (step SB404: YES), the wrist terminal 2 transmits file information of the selected file to the smart phone 1 (step SB405).

If the smart phone 1 receives the file information from the wrist terminal 2 (step SA404: YES), it specifies the file selected by the user based on the received file information and executes a process of the launched application to edit or read the specified file (step SA405). In other words, the smart phone 1 performs a process of opening a specific file.

Accordingly, in the system of the present embodiment, a user can launch the specific application from the wrist terminal 2 regardless of whether or not the smart phone 1 is in a security lock state and further can open the file by using the specific application.

Further, the above described operations of the present embodiment may be performed in the system described with respect to the first embodiment. Specifically, the operations of the smart phone 1 shown in FIG. 11 (*a*) may be continued from the step SA9 of FIG. 4(*a*), and the operations of the wrist terminal 2 shown in FIG. 11(*b*) may be continued from the step SB8 of FIG. 4(*b*).

(Fifth Embodiment)

Next, a fifth embodiment of the present invention will be described. This embodiment relates to a system including a smart phone 1 and the wrist terminal 2 having the configurations shown in FIGS. 2 and 3. In this system, while the smart phone 1 operates in accordance with the quick launch application, the smart phone 1 and the wrist terminal 2 perform following operations in parallel with any one of the operations described with respect to the first to the fourth embodiments.

Figure 12:
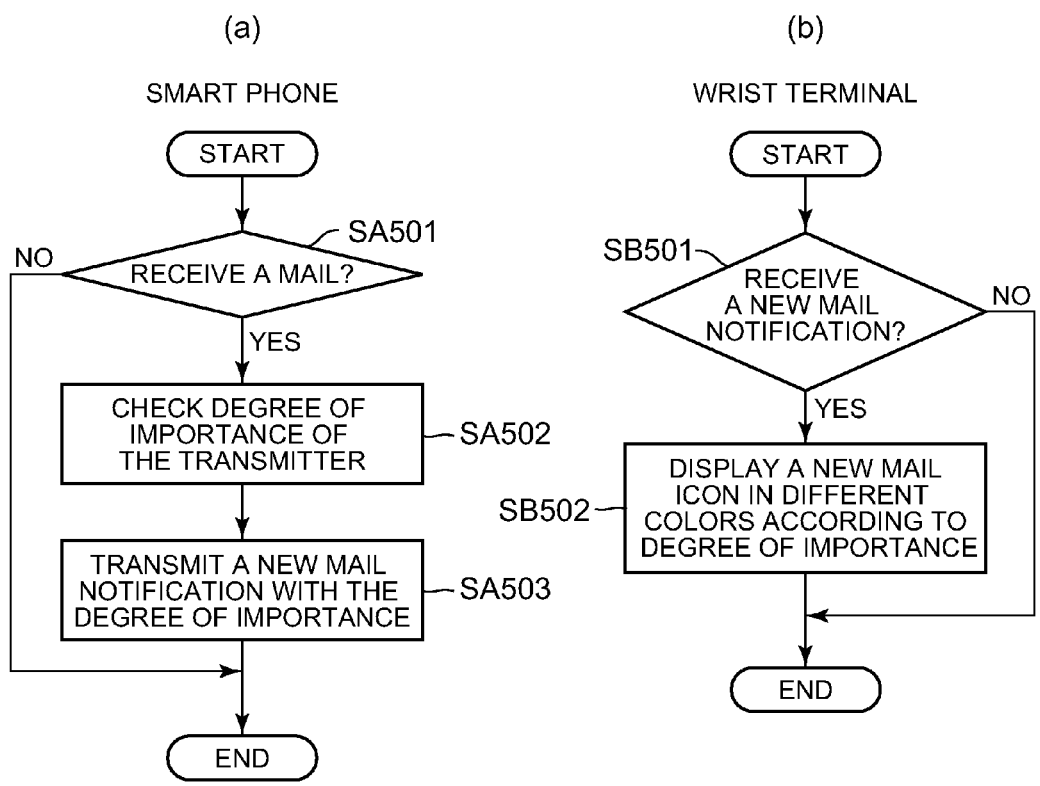
FIG. 12 is a flow chart showing operations of a smart phone and a wrist terminal according to a fifth embodiment of the present invention.

FIGS. 12(*a*) and 12(*b*) are flow charts showing operations of the smart phone 1 and the wrist terminal 2 which are performed in a state where the wrist terminal 2 is registered as an authenticated terminal in the smart phone 1 and a plurality of applications contained in the smart phone 1 are registered in the wrist terminal 2.

As will be described below, after the smart phone 1 starts its operations with the launch of the quick launch application, it checks irregularly whether or not a mail is received, as shown in FIG. 12(*a*). If a mail is not received (step SA501: NO), another operation is performed. In other words, the operation after the step SA5 shown in FIG. 4(*a*) or the operation after the step SA205 shown in FIG. 7(*a*) is performed.

If a mail is received (step SA501: YES), the smart phone 1 first checks the degree of importance of the received mail according to the transmitter (step SA502).

Here, in the present embodiment, a file of an address book is stored in a user memory such as an embedded flash memory of the smart phone 1 (not shown in FIG. 2). In the address bock, a plurality of contacts are grouped and registered. Further, the degree of importance is set in advance for each group.

Contact groups include a first group of clients, superiors or the like, a second group of friends, families or the like, a third group of other transmitters such as magazines or the like. The degree of importance is: "high" for the first group; "middle" for the second group; and "low" for the third group.

In the step SA502, the smart phone 1 checks the group to which the transmitter of the received mail belongs and sets a degree of importance of the received mail to the degree of importance of the corresponding group.

Then, the smart phone 1 transmits to the wrist terminal 2 a new mail notification signal which informs the wrist terminal 2 of the reception of a new mail together with information of the degree of importance of the new mail (step SA503).

As shown in FIG. 12(*b*), if the wrist terminal 2 does not receive a new mail notification signal (step SB501: NO), it performs another operation. Specifically, the wrist terminal 2 performs the operation after the step SB5 shown in FIG. 4(*b*) or the operation after the step SB205 shown in FIG. 7(*b*).

If the wrist terminal 2 receives the new mail notification signal (step SB501: YES), it displays on the display unit 202 a new mail icon which informs the user of the reception of the mail in a color predetermined depending on the degree of importance which is identified by the received information of the degree of importance (step SB502).

The colors are determined depending on the degree of importance. For example, the colors for the degree of importance are: red for 'high'; yellow for 'middle'; and gray for 'low.' Moreover, the display size of the new mail icon is larger than those of other icons on the home screen G (see FIGS. 6(*a*) and 9).

In addition, the new mail icon is prepared in advance in the wrist terminal 2 and relates to the mail program contained in the smart phone 1 of which information is stored as the application information in the pairing target information memory 209. Specifically, the new mail icon is assigned functions similar to those of the other icons and can be used for instructing to launch the mail program.

When the wrist terminal 2 stores the application information received from the smart phone 1 in the pairing target information memory 209, if the information on any of a plurality of predetermined kinds of mail programs is included in the application information, the new mail icon and the mail program are automatically correlated.

Therefore, according to the system of the present embodiment, when the smart phone 1 receives a mail, the user can immediately recognize the reception of the mail through the wrist terminal 2 regardless of whether the smart phone 1 is in the sleep state and whether the smart phone 1 is in the security lock state. Further, the user can recognize the degree of importance of the received mail. Moreover, the user can launch the mail program in the smart phone 1 immediately by touching the new mail icon.

While the present invention has been described in detail based on the above-described embodiments, it should be noted that the present invention includes all of the embodiments in the following claims without being limited to the above detailed description.

[FIG. 1]
(1) Designate a terminal and request connection to it
(2) Designate a terminal and request connection to it
(3) Notify completion of pairing
(4) Issue a pass key (display for 30 sec)
(5) Input condition: Input the issued pass key within 30 sec. The number of input is limited to three times.
入力 input
パスキー pass key

[FIG. 2]
1 Smart Phone
102 Display Unit
104 Display Control Unit
105 Input Unit
107 Program Memory
1071 Control Program
1073 Application Program
1072 Pairing Program
108 Wireless I/F
109 Communication I/F

[FIG. 3]
2 Wrist Terminal
202 Display Unit
204 Display Control Unit
205 Input Unit
209 Pairing Target Information Memory
211 Watch Unit
207 Program Memory
2071 Control Program
2072 Pairing Program
108 Wireless I/F

[FIG. 4]
(a)
Smart Phone
Start
SA1: First launch?
SA2: Pairing
SA3: Transmit application information
SA4: Display a home screen
SA5: Sleep mode ON?
SA6: Receive an application launch command?
SA7: Transmit a launch report
SA8: Terminate the sleep mode
SA9: Launch an application (b)
Wrist Terminal
Start
SB1: First launch?
SB2: Pairing
SB3: Store application information
SB4: Display a home screen
SB5: Select an application?
SB6: Transmit an application launch command
SB7: Receive a launch report?
SB8: Display a confirmation message

[FIG. 5]
(a)
Smart phone
Pairing process
SA101: Search a wrist terminal nearby
SA102: Request connection to a wrist terminal
SA103: Is communication established?
SA104: Issue a pairing completion notification
SA105: Input a pass key
SA106: Satisfy an input condition?
SA107: Complete the connection
(b)
Wrist Terminal
Pairing process
SB101: Search a smart phone nearby
SB102: Request connection to a smart phone
SB103: Is communication established?
SB104: Is there a notification from the smart phone?
SB105: Generate a pass key
SB106: Display the pass key (for 30 sec)

[FIG. 6]
(b)
メモ memo

[FIG. 7]
(a)
Smart Phone
Start
SA201: First launch?
SA202: Pairing
SA203: Transmit application information
SA204: Display a home screen
SA205: Is there a manipulation for a sleep mode?
SA206: Is there no manipulation for a predetermined period of time?
SA207: Checking timing?
SA208: Request connection
SA209: Is there a response?
SA210: Terminate communication N=0
SA211: Terminate communication N=N+1
SA212: N=5?
SA213: Lock all functions
(b)
Wrist Terminal
Start
SB201: First launch?
SB202: Pairing
SB203: Store application information
SB204: Display a home screen
SB205: Is there a connection request?
SB206: Response

[FIG. 8]
(A1)
SA214: Receive an application launch command?
SA215: Transmit a launch report
SA216: Release lock
SA217: Launch an application (B1)
SB207: Select an application?
SB208: Transmit an application launch command
SB209: Receive a launch report?
SB210: Display a confirmation message
SB211: Renew arrangement of icons
SB212: Display an error message
[FIG. 9]
[FIG. 10]
(a)
SA301: Need specific information?
SA302: Request specific information
SA303: Receive specific information?
SA304: Proceed with a process by using the specific information
(b)
SB301: Does the application need specific information?
SB302: Is there a request for specific information?
SB303: Transmit specific information
[FIG. 11]
(a)
SA401: Launch a specific application?
SA402: Acquire file information of candidates to be processed
SA403: Transmit file list data
SA404: Receive information of selected file?
SA405: Specify the selected file and proceed with a process
(b)
SB401: Does the application require file selection?
SB402: Receive file list data?
SB403: Display a file list
SB404: Select a file?
SB405: Transmit information of the selected file
[FIG. 12]
(a)
Smart Phone
Start
SA501: Receive a mail?
SA502: Check degree of importance of the transmitter
SA503: Transmit a new mail notification with the degree of importance
End
(b)
Wrist Terminal
Start
SB501: Receive a new mail notification?
SB502: Display a new mail icon in different colors according to degree of importance
End

What is claimed is:

1. An information processing system comprising:
a portable information terminal having a plurality of functions; and
a wireless terminal which wirelessly communicates with said portable information terminal,
wherein said wireless terminal comprises a first memory and a first processor which executes instructions stored in the first memory to be configured to:
acquire, from said portable information terminal, function information indicating a plurality of programs contained in said portable information terminal; and
transmit, in response to a selection of a program from among the plurality of programs indicated by said acquired function information, a launch instruction signal to said portable information terminal for instructing said portable information terminal to launch said selected program, and
wherein said portable information terminal comprises a second memory and a second processor which executes instructions stored in the second memory to be configured to, in a case in which said portable information terminal is in a security lock state when said launch instruction signal is transmitted thereto, release said security lock state in accordance with reception, from said wireless terminal, of a password which is registered in said portable information terminal when said launch instruction signal is transmitted thereto, and start execution of said selected program whose launch is instructed by said launch instruction signal, following reception of said launch instruction signal from said wireless terminal.

2. The information processing system of claim 1, wherein said first processor of said wireless terminal executes the instructions stored in the first memory to be further configured to perform authentication between said wireless terminal and said portable information terminal by transmitting and receiving wireless signals.

3. The information processing system of claim 1, wherein said second processor of said portable information terminal executes the instructions stored in the second memory to be further configured to perform authentication between said portable information terminal and said wireless terminal by transmitting and receiving wireless signals.

4. The information processing system of claim 1, wherein said second processor of said portable information terminal executes the instructions stored in the second memory to be further configured to:
repetitively check whether or not said wireless terminal can communicate with said portable information terminal; and
set an operation state of said portable information terminal to the security lock state when it is determined that communication with said wireless terminal fails for a predetermined period of time.

5. The information processing system of claim 4, wherein said security lock state of said portable information terminal is an operation state for preventing all manipulations except a lock release manipulation.

6. The information processing system of claim 4, wherein said second processor of said portable information terminal checks at a regular time interval whether or not said portable information terminal can communicate with said wireless terminal that has been authenticated.

7. A wireless terminal in an information processing system comprising a portable information terminal and said wireless terminal which wirelessly communicates with said portable information terminal, said wireless terminal comprising:
a memory; and
a processor which executes instructions stored in the memory to be configured to:
acquire function information indicating a plurality of programs contained in said portable information terminal from said portable information terminal; and
transmit, in response to selection of a program from among the plurality of programs indicated by said acquired function information, a launch instruction signal to said portable information terminal for instructing said portable information terminal to launch said selected program,
wherein in a case in which said portable information terminal is in a security lock state when said launch instruction signal is transmitted thereto, said portable information terminal releases said security lock state in accordance with reception, from said wireless terminal, of a password which is registered in said portable information terminal when said launch instruction signal is transmitted thereto, and starts execution of said selected program whose launch is instructed by said launch instruction signal, following reception of said launch instruction signal from said wireless terminal.

8. The wireless terminal of claim 7, wherein said processor executes the instructions stored in the memory to be further configured to perform authentication between said wireless terminal with said portable information terminal by transmitting and receiving wireless signals.

9. The wireless terminal of claim 7, wherein said security lock state is active while said portable information terminal is in a sleep state in which an inadvertent launch of a function which is not intended by a user is inhibited, and wherein said launch instruction signal is a signal for allowing said portable information terminal to release said sleep state and said security lock state, in accordance with reception of said password, and to start a process relating to a specific function.

10. The wireless terminal of claim 7, wherein said security lock state is a state in which use of all functions of said portable information terminal is restricted, and wherein said launch instruction signal is a signal for allowing said portable information terminal to release said security lock state, in accordance with reception of said password, and to start a process relating to a specific function.

11. The wireless terminal of claim 7, wherein said processor transmits predetermined information which is necessary for operations to be performed up to a predetermined step by said selected program to said portable information terminal in addition to said launch instruction signal.

12. The wireless terminal of claim 7, wherein said selection is a one-touch manipulation on said wireless terminal.

13. The wireless terminal of claim 7, wherein said selection is a password input manipulation on said wireless terminal.

14. The wireless terminal of claim 7, wherein said selection is a touch pattern input manipulation on said wireless terminal.

15. The wireless terminal of claim 7, wherein said wireless terminal is a wrist watch type terminal.

16. The wireless terminal of claim 7, further comprising a display for displaying an icon corresponding to a program among the plurality of programs indicated by said function information,
wherein said selection is performed by touching an icon displayed on said display, and said processor transmits said launch instruction signal for instructing said portable information terminal to launch said selected program corresponding to said touched icon, to said portable information terminal.

17. The wireless terminal of claim 16, wherein said display displays icons corresponding to a part of the plurality of programs indicated by said function information.

18. The wireless terminal of claim 16, wherein said display displays icons corresponding to programs indicated by said function information in an order of priority set for each of said icons.

19. The wireless terminal of claim 17, wherein said display displays icons corresponding to programs belonging to one group of said plurality of programs indicated by said function information simultaneously.

20. A portable information terminal in an information processing system comprising said portable information terminal and a wireless terminal which wirelessly communicates with said portable information terminal, said portable information terminal comprising:
a memory; and
a processor which executes instructions stored in the memory to be configured to:
transmit function information indicating a plurality of programs contained in said portable information terminal to said wireless terminal; and
in a case in which said portable information terminal is in a security lock state when a launch instruction signal is transmitted thereto from said wireless terminal in response to a selection of a program from among the plurality of programs indicated by the function information transmitted to said wireless terminal, release said security lock state in accordance with reception, from said wireless terminal, of a password which is registered in said portable information terminal when said launch instruction signal is transmitted thereto from said wireless terminal, and start execution of said selected program whose launch is instructed by said launch instruction signal, following reception of said launch instruction signal from said wireless terminal.

21. The portable information terminal of claim 20, wherein said processor executes the instructions stored in the memory to be further configured to perform authentication between said portable information terminal and said wireless terminal by transmitting and receiving wireless signals.

22. A method for starting a portable information terminal in an information processing system which comprises said portable information terminal and a wireless terminal which wirelessly communicates with said portable information terminal, said method comprising:
acquiring, by a processor of said wireless terminal, function information indicating a plurality of programs contained in said portable information terminal, from said portable information terminal;
in response to a selection of a program from among the plurality of programs indicated by said function information acquired from said portable information terminal, transmitting, by the processor of the wireless terminal, a launch instruction signal to said portable information terminal for instructing said portable information terminal to launch said selected program; and
in a case in which said portable information terminal is in a security lock state when said launch instruction signal is transmitted thereto from said wireless terminal, releasing said security lock state in accordance with reception, from said wireless terminal, of a password which is registered in said portable information terminal when said launch instruction signal is transmitted thereto, and starting execution of said selected program whose launch is instructed by said launch instruction signal, by a processor of said portable information terminal, following reception of said launch instruction signal from said wireless terminal.

23. A method for instructing launch by a wireless terminal in an information processing system which comprises said wireless terminal and a portable information terminal which wirelessly communicates with said wireless terminal, said method comprising:
acquiring, by a processor of said wireless terminal, function information indicating a plurality of programs contained in said portable information terminal, from said portable information terminal; and in response to a selection of a program from among the plurality of programs indicated by said function information acquired from said portable information terminal, transmitting, by the processor of said wireless terminal, a launch instruction signal to said portable information terminal for instructing said portable information terminal to launch said selected program, wherein in a case in which said portable information terminal is in a security lock state when said launch instruction signal is transmitted thereto from said wireless terminal, said portable information terminal releases said security lock state in accordance with reception, from said wireless terminal, of a password which is registered in said portable information terminal when said launch instruction signal is transmitted thereto, and starts execution of said selected program whose launch is instructed by said launch instruction signal, following reception of said launch instruction signal from said wireless terminal.

24. A non-transitory computer-readable recording medium having stored thereon instructions which are executable by a computer of a wireless terminal in an information processing system comprising said wireless terminal and a portable information terminal which wirelessly communicates with said wireless terminal, said instructions being executable by said computer of said wireless terminal to cause said computer to perform functions comprising:

acquiring function information indicating a plurality of programs contained in said portable information terminal, from said portable information terminal; and in response to selection of a program from among the plurality of programs indicated by said acquired function information, transmitting to said portable information terminal a launch instruction signal for instructing said portable information terminal to launch said selected program, wherein in a case in which said portable information terminal is in a security lock state when said launch instruction signal is transmitted thereto, said portable information terminal releases said security lock state in accordance with reception, from said wireless terminal, of a password which is registered in said portable information terminal when said launch instruction signal is transmitted thereto, and starts execution of said selected program whose launch is instructed by said launch instruction signal, following reception of said launch instruction signal from said wireless terminal.

25. A non-transitory computer-readable recording medium having stored thereon instructions which are executable by a computer of a portable information terminal in an information processing system comprising said portable information terminal and a wireless terminal which wirelessly communicates with said portable information terminal, said instructions being executable by said computer of said portable information terminal to cause said computer to perform functions comprising:

transmitting function information indicating a plurality of programs contained in said portable information terminal, to said wireless terminal; and in a case in which said portable information terminal is in a security lock state when a launch instruction signal is received which is transmitted from said wireless terminal in response to a selection of a program from among the plurality of programs indicated by the function information transmitted to the wireless terminal, releasing said security lock state in accordance with reception, from said wireless terminal, of a password which is registered in said portable information terminal when said launch instruction signal is transmitted thereto, and starting execution of said selected program whose launch is instructed by said launch instruction signal, following reception of said launch instruction signal from said wireless terminal.

26. The information processing system according claim 1, wherein said second processor of said portable information terminal executes the instructions stored in the second memory to be configured, in the case in which said portable information terminal is in the security lock state, to successively check for reception of said launch instruction signal from said wireless terminal.

* * * * *

UNITED STATES PATENT AND TRADEMARK OFFICE
CERTIFICATE OF CORRECTION

| | |
|---|---|
| PATENT NO. | : 9,641,662 B2 |
| APPLICATION NO. | : 14/086542 |
| DATED | : May 2, 2017 |
| INVENTOR(S) | : Yoshiharu Houjou et al. |

It is certified that error appears in the above-identified patent and that said Letters Patent is hereby corrected as shown below:

In the Claims

Column 24, Line 35, after "according" insert --to--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*